United States Patent

Staub, Jr.

[11] Patent Number: 4,673,069
[45] Date of Patent: Jun. 16, 1987

[54] WHEEL CYLINDER MOUNTING ARRANGEMENT

[75] Inventor: Vincent M. Staub, Jr., Dayton, Ohio

[73] Assignee: General Motors Corporation, Detroit, Mich.

[21] Appl. No.: 842,659

[22] Filed: Mar. 18, 1986

[51] Int. Cl.[4] ............................................. F16D 65/02
[52] U.S. Cl. .................................. 188/331; 188/205 R; 188/206 A; 188/341; 92/161
[58] Field of Search ................. 188/341, 325, 327–333, 188/206 A, 206 R, 205 R, 205 A, 361, 362, 363, 364, 18 R, 78; 92/161, 75

[56] References Cited

U.S. PATENT DOCUMENTS

| | | | |
|---|---|---|---|
| 3,200,908 | 8/1965 | Budd et al. | 188/206 R X |
| 3,279,570 | 10/1966 | Parks | 188/331 X |
| 3,301,355 | 1/1967 | Borgard | 188/331 X |
| 3,576,237 | 4/1971 | Dubuc | 188/206 A |
| 4,061,429 | 12/1977 | Mathues | 188/341 X |
| 4,102,442 | 7/1978 | Colpaert | 188/341 X |
| 4,197,928 | 4/1980 | Kluger | 188/206 A |
| 4,203,508 | 5/1980 | Borkowski | 188/364 X |

Primary Examiner—Douglas C. Butler
Attorney, Agent, or Firm—D. D. McGraw

[57] ABSTRACT

A clamping bracket arrangement is provided which tightly grips the mounting boss of a wheel cylinder and the axle housing to which the brake assembly of which the wheel cylinder is a part is mounted, preventing movement of the wheel cylinder relative to the axle housing. The bracket arrangement may be quickly and easily installed in field service without the need for removing any parts of the brake assembly.

11 Claims, 9 Drawing Figures

WHEEL CYLINDER MOUNTING ARRANGEMENT

The invention relates to an arrangement for mounting a wheel cylinder in a wheel brake assembly for location and security, and more particularly to a drum brake arrangement where a thin wall mounting plate having a strength character incapable of taking the brake torque is utilized to mount the brake shoes and provide initial location of the wheel cylinder. The backing plate is secured to a mounting flange which in turn is fixed to an axle support member such as an axle housing. The anchor pin for the brake shoes is secured to the flange and also acts as a backing plate mounting bolt. The anchor pin is assembled directly to the mounting flange, eliminating torque transfer through the backing plate assembly. This provides for a more precise anchor pin location than is the case when a backing plate is mounted on a support member and the anchor pin is then mounted on the backing plate. By providing the wheel cylinder initial location and mounting on the thin backing plate, requiring no torque to be transmitted through the backing plate, and using a mounting bracket to retain the wheel cylinder in proper location by grounding it to the axle support member, a simple wheel cylinder casting can be utilized, with the wheel cylinder being retained by an exteriorly installed and removable bracket arrangement instead of commonly used wheel cylinder mounting bolts or clips. The brake adjusting mechanism, parking brake linkage, brake shoe tie-downs, and brake shoe retracting springs are assembled as a part of the brake unit mounted on the backing plate in a manner similar to that in current use. When the brake is used as a front wheel brake, the parking brake mechanism is not required and the mounting flange is secured to a fixed support which may be a part of the steering knuckle or other front axle support.

Figure 1:
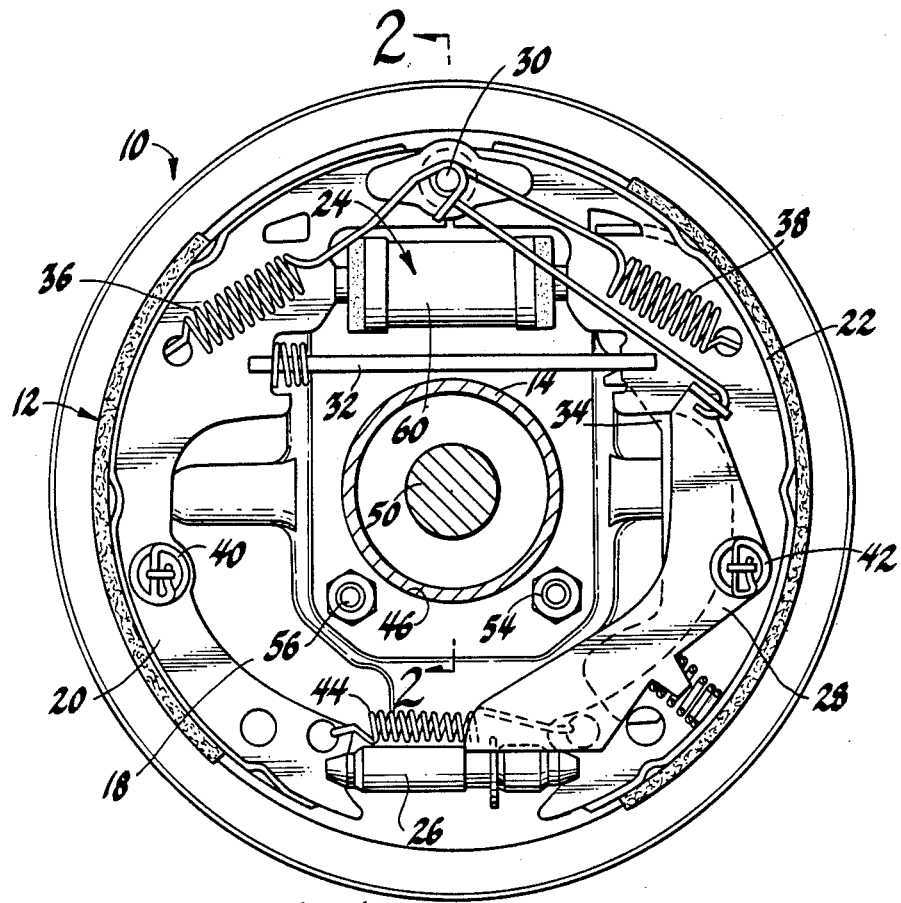
FIG. 1 is an elevation view of a wheel brake assembly embodying the invention with parts in section.

The wheel brake unit 10 is illustrated as including a wheel brake assembly 12, an axle support member or housing 14, and a wheel brake unit mounting flange 16. The brake drum, which is also a part of the wheel brake assembly, is not illustrated for simplicity. However, the brake drum is provided in a manner well known in the art. FIG. 1 is an outer side view of the wheel brake assembly with the drum removed, while FIGS. 3, 5, 7, and 9 are inner side views of the assembly. The wheel brake assembly 12 includes a backing plate 18, brake shoes 20 and 22, a wheel cylinder 24 positioned between the upper end of brake shoes 20 and 22, an adjuster screw 26 positioned between the lower ends of the shoes 20 and 22, an adjuster actuating mechanism 28, and an anchor pin 30. If the wheel brake unit is for the vehicle wheels having a parking brake mechanism, it will also include a brake shoe spreader bar 32 and appropriate parking brake linkage 34. The brake shoe retracting springs 36 and 38, the shoe hold-down mechanisms 40 and 42, and adjuster screw spring 44 are also parts of the wheel brake assembly 12.

Figure 2:
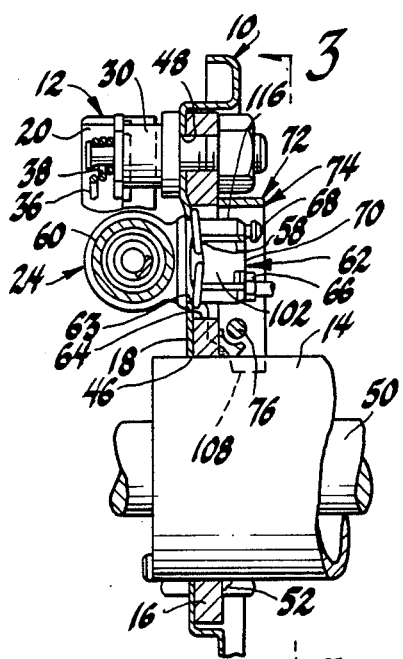
FIG. 2 is a cross section view taken in the direction of arrows 2—2 of FIG. 1 and having parts broken away.

The backing plate 18 has a centrally formed axle-receiving opening 46 and an anchor pin-receiving opening 48 which is positioned radially outward of opening 46. The axle housing or support member 14 extends through opening 46 as shown in FIG. 2. The axle 50, which is a rear axle for the wheel of the particular brake assembly illustrated, is suitably mounted in the housing 14. The mounting flange 16 is secured to the axle housing 14 by suitable means such as weld 52. The backing plate 18 is secured to the mounting flange 16 on one side of opening 46 by the anchor pin 30, which thus acts as a backing plate circumferential locating and mounting means. Two mounting bolt assemblies 54 and 56, on the generally opposite side of opening 46 from the anchor pin 30, also fasten the backing plate to the flange.

It is advantageous to have the anchor pin assembled directly to the mounting flange, eliminating torque transfer through the backing plate assembly. Since the backing plate only needs to initially locate and hold but not take stresses from the wheel cylinder, and to support in the brake shoes guiding relation, its thickness is reduced to approximately half that of conventional backing plates and is a thin wall of material. A more simple wheel cylinder casting is used, and the wheel cylinder needs only to be mounted for location and security retention.

The wheel cylinder 24 has its main body 60 positioned on the side of the backing plate 18 opposite the mounting flange 16. It is provided with a mounting boss 62 extending laterally from the main body 60 through opening 63 in backing plate 18 and axially aligned opening 64 in mounting flange 16. Opening 64 is located intermediate the axle housing 14 and the anchor pin-receiving opening 48, and is somewhat larger in diameter than boss 62 so that there is substantial clearance therebetween. The mounting boss 62 preferably fits snugly within backing plate opening 63 so that the wheel cylinder assembly is at least substantially located in its operating position, as shown in the below noted U.S. Pat. No. 4,061,429. Brake hose-receiving fitting 66 and bleed fitting 68 are preferably mounted in the outer end 70 of boss 62 and are positioned on the inner side of the brake unit for accessibility. The circumferentially spaced relation of the boss 62 to the portion of the mounting flange 16 defining opening 64 also permits the desired installation of the mounting bracket arrangement 72 to which the claimed invention is particularly directed.

The brake unit described to this extent, except for the mounting bracket arrangement 72, is substantially the same as the wheel brake assembly of U.S. Pat. No. 4,061,429, entitled "Wheel Brake Assembly" and issued Dec. 6, 1977. Instead of, or in addition to, using the wire clip shown in that patent to retain the wheel cylinder in place in backing plate opening 63 so that the wheel cylinder is located and supported by that backing plate, the mounting bracket arrangement 72, or one of the other embodiments disclosed herein, is used to locate and mount the wheel cylinder securely in relation to the axle housing 14 without interfering in any manner with the anchor pin 30 or other parts of the brake assembly. The mounting bracket arrangement 72 therefore prevents movement of the wheel cylinder 24 relative to the backing plate 18 and the axle housing 14. Also, the mounting bracket arrangement 72 may be installed and loosened, or even be removed from the brake unit, without removing the vehicle wheel and the brake drum. It therefore requires no disassembly of the brake assembly if it is found to be desirable to replace or augment the clip of the above noted patent with the mounting bracket arrangement in field service.

Figure 4:
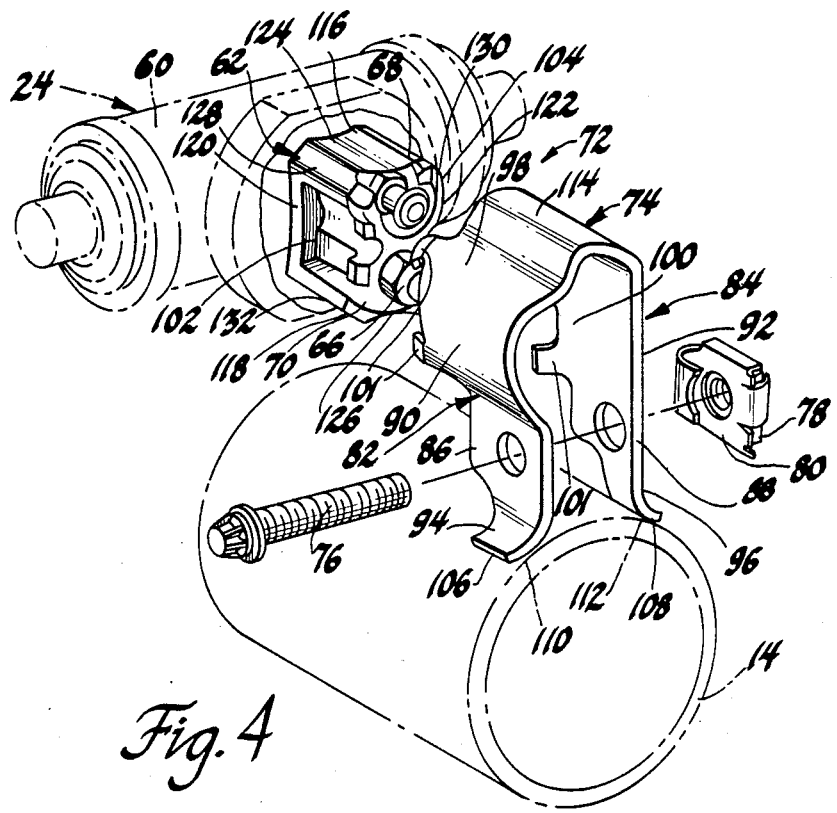
FIG. 4 is a perspective view of the mounting bracket of FIG. 3, including in exploded relation the wheel cylinder boss and the bracket-tightening bolt and nut with its mounting clip.

As may be better seen in FIG. 4, the mounting bracket arrangement 72 includes the bracket 74 and a bolt-and-nut arrangement such as headed bolt 76, nut 78 and nut mounting clip 80. Bracket 74 fits about the wheel cylinder mounting boss 62 and engages axle housing 14. It has generally parallel first and second legs 82 and 84 respectively having first and second intermediate portions 86 and 88, first and second upper portions 90 and 92, and first and second lower portions 94 and 96. First and second upper portions 90 and 92 respectively have first and second extensions 98 and 100. These extensions extend into the opening 64 between the edge surface defining that opening and the wheel cylinder mounting boss 62 so as to be positioned on opposite sides 102 and 104 of the boss 62 in engageable relation with portions of those opposite sides which extend into and through opening 64. These opposite portions are side sections of the boss 62 which are to be gripped by the bracket leg upper portions 90 and 92, including the extensions 98 and 100. The extensions may be generally flat so they have a surface or line engagement with the mounting boss 62 in the manner of the embodiment of FIGS. 5 and 6. However, in the preferred embodiment the leg upper portion 90 is arcuately curved as described below. Also, they may be provided with spring tabs 101 which extend therefrom toward engagement with the mounting boss 62. The tabs 101 may be so arranged that they will engage the boss in spaced relation at various points about the boss and hold the main body of the bracket 74 in slight outwardly spaced relation to the mounting boss 62. When the bracket 74 is installed and tightened, the ends of the tabs will tend to tightly grip the boss to provide a more positive grip nearer the main body 60 of the wheel cylinder than might be obtained with surface-to-surface gripping action. The tabs 101 are also preferably arranged to enhance the location of the bracket in circumferential relation to the mounting boss 62. Thus the tabs on the bracket leg upper portion 92 are positioned for alignment with the side 104 of the mounting boss, and also preferably are aligned to engage arcuate edges of the arcuate recess 122 formed on that side. The upper tab on the bracket leg upper portion 90 is preferably aligned to engage the arcuate top side 116 of the boss 62 near its juncture with boss side 102. If that arcuate top side is provided with an arcuate recess such as recess 124 further described below, that upper tab is positioned to engage the beveled corner 128, also further described below. The lower tab on the bracket leg upper portion 90 is preferably aligned to engage the lower corner 132 of boss 62 or to extend into the arcuate recess 120 adjacent corner 132 to further enhance the positioning of the bracket relative to the boss 62. The tabs 101 are particularly desirable when there are minimal boss side areas for engagement by the bracket upper portions 90 and 92, or when the bracket is being installed with the wire clip 58 in place as illustrated in the above noted patent. When the bracket is being installed in field service with the wire clip in place, it is important for the bracket leg upper portion 90 to be formed arcuately outward between the bridge portion 114 and the intermediate leg portion 86 so that it can be inserted over and beyond the clip with the tabs 101 on the legs engaging the boss 62 between the clip and the main body 60 of the wheel cylinder. This arcuate form of the bracket leg upper portion 90 is also helpful in spring loading the bracket as well as providing a desirable angle of engagement of the tabs on upper portion 90 with the mounting boss 62 as above described.

Figure 3:
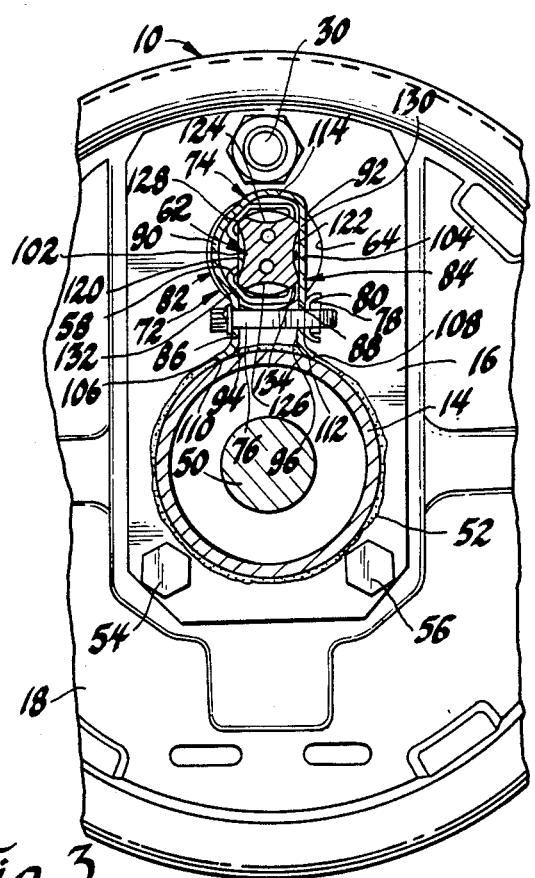
FIG. 3 is an elevation view of the other side of the wheel brake assembly of FIG. 1, taken in the direction of arrows 3—3 of FIG. 2 and having parts broken away and in section.

The first and second lower portions 94 and 96 respectively have first and second ends 106 and 108 arranged to engage the axle housing 14. The lines or areas of engagement are transversely and chordally spaced on the axle housing so that the ends 106 and 108 are clamped to the axle housing in a gripping relation when the leg lower portions 94 and 96 are moved closer together by tightening the bolt 76. The ends 106 and 108 of lower portions 94 and 96 are illustrated in the embodiment of FIGS. 2, 3 and 4 as being bent slightly outward so that they approach the shape of the portions 110 and 112 of the axle housing that they engage in gripping relation. These axle housing portions 110 and 112 are in laterally spaced alignment with the mounting boss 62 and the anchor pin 30, and particularly that part of the anchor pin which extends beyond the backing plate 18 on the opposite side thereof from the brake shoes 20 and 22, as is readily seen in FIG. 2. As shown, this part of the anchor pin includes a locking nut threaded on one end of the anchor pin and holding the anchor pin on the mounting flange 16.

This embodiment also has the leg upper portions 90 and 92 joined by a bridge portion 114. In the typical brake assembly of this type there is only a small clearance space between the wheel cylinder mounting boss 62 and the anchor pin, so that the bridge portion 114 should be somewhat closely conformed to the boss so as to be insertable without requiring disconnection or removal of any brake assembly parts when the bracket assembly is installed as an after-market device. As illustrated, it may have some clearance relative to the mounting boss when installed and be appropriately shaped to also provide a spring loading effect when the bracket is tightened during installation. Other illustrated embodiments show somewhat different configurations of the legs and their relationships to the mounting boss 62 and the axle housing 14. In all embodiments shown, however, the bracket 74 and all similar brackets are made of a spring material such as spring tempered steel.

When the bracket is installed as illustrated, it prevents movement of the wheel cylinder 24 in relation to the backing plate 18. It also prevents movement of the wheel cylinder 24 relative to the axle housing 14. Since the mounting flange 16 is secured to the axle housing, movement of the wheel cylinder 24 relative to the mounting flange 16 is also prevented.

Figure 5:
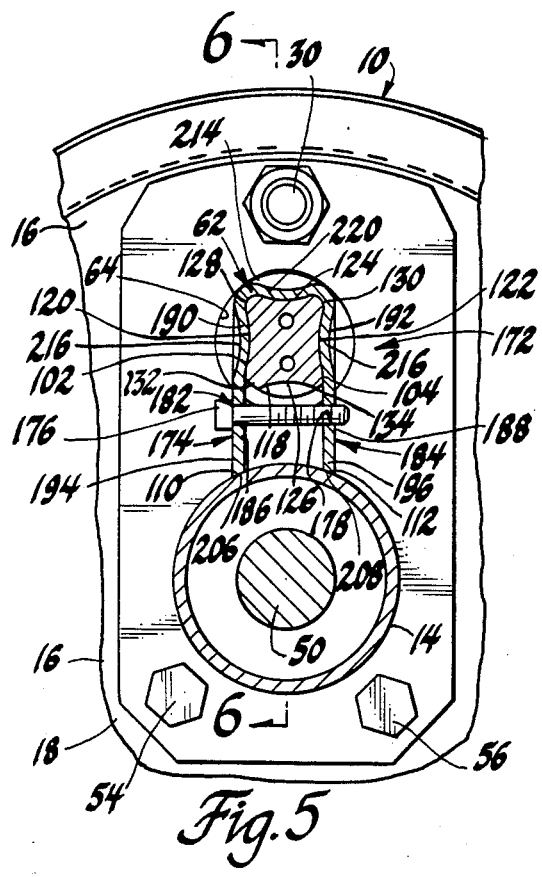
FIG. 5 is a view similar to FIG. 3, showing another embodiment of the mounting bracket.
Figure 6:
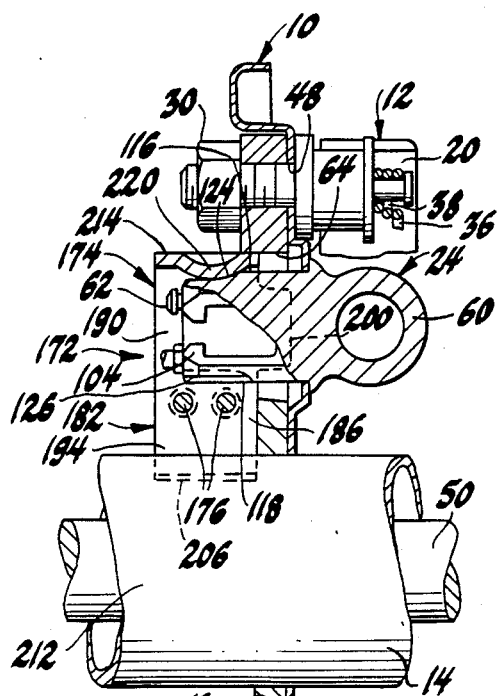
FIG. 6 is a cross section view of the brake assembly of FIG. 5, with parts broken away, taken in the direction of arrows 6—6 of that FIGURE, and is similar to FIG. 2.

The embodiment shown in FIGS. 5 and 6 is generally similar to the embodiment of FIGS. 2–4 described above. The parts of the brake assembly other than the mounting bracket arrangement 72 may be identical, and the same reference numerals are applied to them. The mounting bracket arrangement 172 includes the bracket 174 and a threaded bolt arrangement such as headed bolt 176 and threaded opening 178 in bracket 174. If desired, a nut and clip similar to nut 78 and nut mounting clip 80 of the earlier described embodiment may be used, particularly if the bracket material is not sufficiently thick to provide full support to a threaded opening. In some instances nut 78 may be secured to the bracket by other means than a clip.

Bracket 174 fits about the wheel cylinder mounting boss 62. It has generally parallel first and second legs 182 and 184 respectively having first and second intermediate portions 186 and 188, first and second upper portions 190 and 192, and first and second lower portions 194 and 196. First and second upper portions 190 and 192 respectively have first and second extensions similar to extensions 98 and 100, with extension 200 of portion 192 being shown in dashed lines in FIG. 6. They may or may not have gripping tabs formed thereon, similar to the tabs 101 of bracket 74 of FIGS. 2–4. However, they are here illustrated without such tabs. These extensions extend into the opening 64 between the edge surface defining that opening and the wheel cylinder mounting boss 62 so as to be positioned on opposite sides 102 and 104 of the boss 62 in engageable relation with portions of those opposite sides which extend into and through opening 64. These opposite side portions are side sections of the boss 62 which are to be gripped by the bracket leg upper portions 190 and 192, including the extensions thereof.

The first and second lower portions 194 and 196 respectively have first and second ends 206 and 208 arranged to engage the axle housing 14. The lines or areas of that engagement are transversely spaced on the axle housing, preferably chordally, so that the ends 206 and 208 are clamped to the axle housing in a gripping relation when the leg lower portions 194 and 196 are moved closer together by tightening the bolt 176. The ends 206 and 208 are illustrated in the embodiment of FIGS. 5 and 6 as being straight continuations of legs 182 and 184. However, they may also be bent slightly outward so that they approach the shape of the portions 110 and 112 of the axle housing which they engage in gripping relation, in the same manner as shown in FIG. 3.

This embodiment also has the leg upper portions 190 and 192 joined by a bridge portion 214. As is the bridge portion 114 of the earlier described embodiment, the bridge portion 214 should closely conform to the boss so as to be insertable without requiring disconnection or removal of any brake assembly parts when the bracket assembly is installed as an after-market device. In either embodiment, the bridge portion is a spring section between the two legs.

In the brake assembly illustrated, the mounting boss 62 is generally square or rectangular in cross-section, with opposite sides 102 and 104 being recess at 120 and 122, respectively. The top and bottom sides 116 and 118 may be arcuately rounded, or may be recessed as indicated respectively at 124 and 126. The corners 128, 130, 132 and 134 are preferably arcuately beveled as shown if recesses 124 and 126 are provided. One of the upper portions 190 and 192 of legs 182 and 184, and preferably both of them, are preferably indented to form one or more protrusions 216 which extend into the mounting boss recesses aligned with them. In some arrangements, a similar protrusion may be formed in the bridge portion 214 and extend into a mating mounting boss recess 124.

Figure 7:
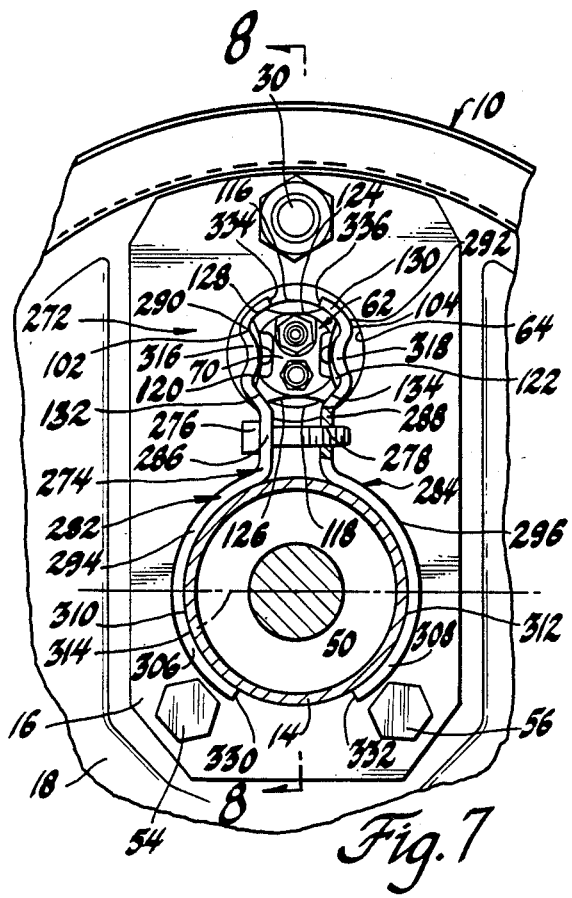
FIG. 7 is a view similar to FIG. 3, showing a third embodiment of the mounting bracket.
Figure 8:
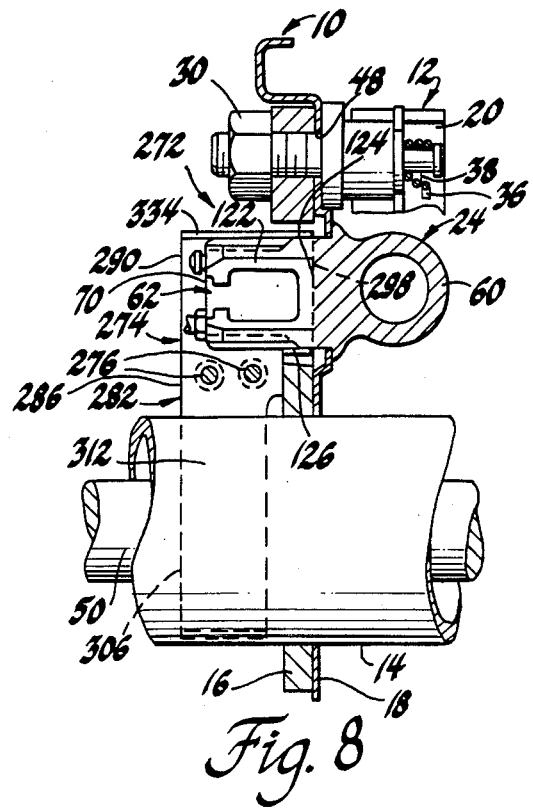
FIG. 8 is a cross section view of the brake assembly of FIG. 7, with parts broken away, taken in the direction of arrows 8—8 of that FIGURE, and is similar to FIG. 2.

The embodiment shown in FIGS. 7 and 8 is generally similar to the embodiments of FIGS. 2–4 and FIGS. 5 and 6 described above. The parts of the brake assembly other than the mounting bracket arrangement 72 or 172 are substantially identical, and the same reference numerals are applied to them.

The mounting bracket arrangement 272 includes the bracket 274, a threaded bolt arrangement such as headed bolt 276 and a threaded opening 278 in bracket 274. Bracket 274 fits about the wheel cylinder mounting boss 62. It has generally parallel first and second legs 282 and 284 respectively having first and second intermediate portions 286 and 288, first and second upper portions 290 and 292, and first and second lower portions 294 and 296. First and second upper portions 290 and 292 respectively have first and second extensions similar to extensions 98 and 100, with extension 298 of portion 290 being shown in dashed lines in FIG. 8. These extensions extend into the opening 64 between the edge surface defining that opening and the wheel cylinder mounting boss 62 so as to be positioned on opposite sides 102 and 104 of the boss 62 in engageable relation with portions of those opposite sides which extend into and through opening 64. These opposite side portions are side sections of the boss 62 which are to be gripped by the bracket leg upper portions 290 and 292, including the extensions thereof.

The first and second lower portions 294 and 296 respectively have first and second arcuate ends 306 and 308 arranged to engage the axle housing 14 on opposite sides 310 and 312 throughout a substantial arc so that the axle housing is cupped between the two arcuate ends. The areas of engagement on axle housing sides 310 and 312 are transversely spaced on the axle housing and extend from an upper chordal area above the horizontal diameter illustrated to a lower chordal area below that horizontal diameter 314 so that the arcuate ends 306 and 308 are clamped to the axle housing in a cupped gripping relation when the leg lower portions 294 and 296 are moved closer together by tightening the bolt 276. The ends 306 and 308 are illustrated in the embodiment of FIGS. 7 and 8 as extending sufficiently far around the axle housing that their extreme ends 330 and 332 approach each other but remain in transverse spaced relation.

The leg upper portions 290 and 292 in this embodiment are not joined by a bridge portion, the two legs being separate parts of the bracket 274 to permit assembly by placing each of the legs in position, inserting bolt 276, and tightening it until the mounting arrangement tightly grips the mounting boss 62 of the wheel cylinder and the axle housing 14. The upper leg portions 290 and 292 preferably closely conform to the boss so as to be installed without requiring disconnection or removal of any brake assembly parts when the bracket assembly is installed as an after-market device.

The upper portions 290 and 292 of legs 282 and 284 are preferably contoured or indented to form one or more protrusions 316 and 318 which extend into the recesses 120 and 122 aligned with them. The extreme ends 334 and 336 of portions 290 and 292 are preferably contoured to engage the boss corners 128 and 130, and their sections below protrusions 316 and 318 are similarly contoured to engage the boss corners 132 and 134, as shown. This further assists in positive location and retention.

Figure 9:
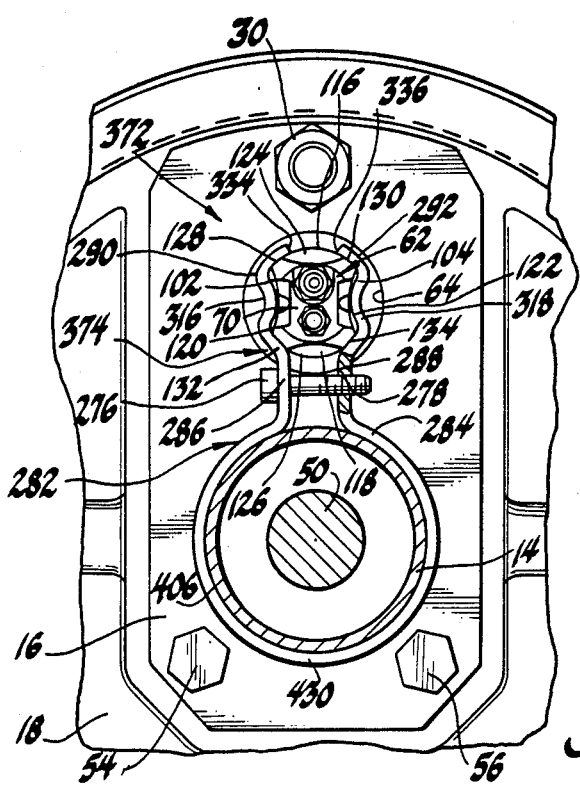
FIG. 9 is a view similar to FIG. 3, showing a fourth embodiment of the mounting bracket.

The embodiment of FIG. 9 is quite similar to that of FIGS. 7 and 8, except that the bracket 374 of mounting bracket arrangement 372 is made in one piece, with the arcuate ends 406 and 408 being joined at 430 so that they form a clamp which wraps about substantially all of the circumference of the axle housing 14, leaving only the part thereof adjacent the bolt 276 uncovered. Except for these elements, the parts of the arrangement are the same as in FIGS. 7 and 8, and the same reference characters are used for such same parts. Bracket 374 is installed by spreading the two legs apart against the spring characteristic of the bracket, and particularly arcuate ends 406 and 408 and their juncture 430. The bracket is then placed around the axle housing 14 at the brake assembly, and moved axially of the mounting boss 62 so that the extensions properly extend into opening 64 as earlier described to be able to engage the opposite sides of the mounting boss. The bolt 276 is then inserted and tightened until the bracket 374 tightly grips the axle housing and the mounting boss.

The embodiments of the invention in which an exclusive property or privilege is claimed are defined as follows:

I claim:

1. For use in a wheel brake assembly having an axle housing with a mounting flange secured thereto, a non-braking torque-taking backing plate secured to one side of the mounting flange and supporting brake shoes for guided braking movement, an anchor pin secured to the mounting flange through the backing plate and providing means receiving braking torque from the brake shoes and transmitting that torque through the mounting flange to the axle housing, a wheel cylinder having a main body and a mounting boss extending transversely from the main body, that boss extending through a snugly fitting wheel cylinder-locating opening in the backing plate and an opening in the mounting flange which is larger in diameter than the mounting boss so as to provide lateral clearance around the mounting boss therein relative to the mounting flange, the improvement including:

a wheel cylinder locating and securing arrangement which when installed grips side portions of the wheel cylinder mounting boss and the axle housing on the opposite side of the backing plate from the brake shoes to locate and secure the wheel cylinder to the axle housing independently of the locating opening in the backing plate, said arrangement comprising:

bracket means having a first leg and a second leg, said legs respectively having first and second upper portions and first and second lower portions and first and second intermediate portions;

said first and second upper portions having extensions adapted to extend into the opening in the mounting flange receiving the wheel cylinder mounting boss so as to be positioned on opposite sides of the wheel cylinder mounting boss including at least portions of those opposite sides extending through the mounting flange opening, and being arranged to grip side sections of the wheel cylinder mounting boss;

said first and second lower portions having ends adapted to engage the axle housing in gripping relation at least at transversely spaced points thereon;

said first and second intermediate portions having adjustable tightening and loosening means extending therebetween, said adjustable tightening and loosening means when tightened during installation of said arrangement moving said first and second legs closer together to cause said first and second upper portions to tightly grip the wheel cylinder mounting boss in non-slipping clamping relation and said first and second lower portions to tightly grip the axle housing in non-slipping clamping relation, thereby locating and securing said wheel cylinder to said axle housing, said adjustable tightening and loosening means being capable of being loosened to loosen the clamping grip of said legs on the wheel cylinder mounting boss and the axle housing, permitting removal of the wheel cylinder from the backing plate for service.

2. In a wheel brake assembly having an anchor pin secured to a braking torque-transmitting support bracket on an axially extending wheel brake assembly support, means preventing movement of a wheel cylinder relative to a non-braking torque-taking backing plate secured at least in part to the support bracket by the anchor pin and also relative to the axially extending wheel brake assembly support which receives braking torque from the anchor pin via the support bracket, the backing plate forming a part of the wheel brake assembly and having the wheel cylinder mounted thereon, said movement preventing means comprising:

a wheel cylinder mounting boss formed as a part of the wheel cylinder and extending in axially parallel laterally spaced relation to and between the wheel brake assembly support and the anchor pin, said wheel cylinder mounting boss being in spaced juxtaposition to the anchor pin;

a portion of the wheel brake assembly support being in laterally spaced alignment with said wheel cylinder mounting boss and the anchor pin;

and mounting bracket means including a pair of generally parallel legs having transverse tightening and loosening means intermediate the opposite ends thereof acting on said legs to move them closer together and further apart for clamping and releasing action;

said mounting bracket means having first adjacent portions on first ends of said legs receiving said wheel cylinder mounting boss therebetween, said first adjacent portions extending at least partially between said wheel cylinder mounting boss and a part of said anchor pin, and second adjacent portions on the other ends of said legs receiving said wheel brake assembly support portion therebetween, said transverse tightening and loosening means being tightened to grip said legs about said wheel cylinder mounting boss and to grip said wheel brake assembly support portion to prevent movement of the wheel cylinder relative to the non-braking torque-taking backing plate and the wheel brake assembly support.

3. In a wheel brake assembly having an anchor pin secured to a braking torque-transmitting support bracket on an axially extending wheel brake assembly support, means preventing movement of a wheel cylinder relative to a non-braking torque-taking backing plate secured at least in part to the support bracket by the anchor pin and also relative to the axially extending wheel brake assembly support which receives braking torque from the anchor pin via the support bracket, the backing plate forming a part of the wheel brake assembly and having the wheel cylinder mounted thereon, said movement preventing means comprising:

a wheel cylinder main body and a mounting boss formed as a part of the wheel cylinder and extending from the wheel cylinder main body in parallel laterally spaced relation to and between the wheel brake assembly support and the anchor pin, said wheel cylinder mounting boss being in axially parallel and laterally spaced juxtaposition to the anchor pin;

a portion of the wheel brake assembly support being in laterally spaced alignment with said wheel cylinder mounting boss and the anchor pin;

and mounting bracket means including a pair of generally parallel legs having transverse tightening and loosening means intermediate the opposite ends thereof acting on said legs to move them closer together and further apart for clamping and releasing action;

said mounting bracket means having first adjacent portions on first ends of said legs receiving said wheel cylinder mounting boss therebetween, said first adjacent portions extending at least partially between said wheel cylinder mounting boss and a part of said anchor pin, and second adjacent portions on the other ends of said legs receiving said wheel brake assembly support portion therebetween, said legs being joined at one of their adjacent ends so that they wrap substantially around the element that they grip, thereby providing a unitary mounting bracket body;

said transverse tightening and loosening means being tightened to grip said legs about said wheel cylinder mounting boss and to grip said wheel brake assembly support portion to prevent movement of the wheel cylinder relative to the non-braking torque-taking backing plate and the wheel brake assembly support.

4. The mounting bracket means of claim 3 in which said leg first ends are so joined and said first adjacent portions wrap substantially around said wheel cylinder mounting boss.

5. The mounting bracket means of claim 3 in which said leg other ends are so joined and said second adjacent portions wrap substantially around said wheel brake assembly support.

6. The mounting bracket means of claim 3 in which said transverse tightening and loosening means comprises at least one headed and threaded bolt extending through both of said legs with the head thereof engaging one of said legs and the bolt end opposite said head being operatively threadedly secured to the other of said legs so that said bolt may be rotated in one direction to threadedly move said legs closer together and may be rotated in the opposite direction to permit said legs to spread apart and release said wheel cylinder mounting boss, permitting removal and replacement of said wheel cylinder mounting boss for servicing.

7. The mounting bracket of claim 3 in which said legs have spring tabs extending therefrom toward and engaging said wheel cylinder mounting boss in spaced relation about said boss, the ends of said spring tabs tending to grip said boss adjacent the wheel cylinder main body.

8. The mounting bracket of claim 3 in which a section of at least one of said legs where it contacts said wheel cylinder mounting boss is substantially straight while the side of said boss in juxtaposition to said straight leg section is recessed so that spaced portions of said boss are contacted by the straight section.

9. The mounting bracket of claim 3 in which a section of at least one of said legs where it contacts said wheel cylinder mounting boss is substantially straight while the side of said boss in juxtaposition to said straight leg section is recessed so that spaced portions of said boss are contacted by the straight section, said at least one leg straight section having a part displaced so as to extend into said recess and engage at least part of said recess and further locate and prevent relative movement between said mounting bracket and said wheel cylinder mounting boss when said legs grip said boss.

10. The mounting bracket of claim 3 in which a section of at least one of said legs is arcuately contoured so as to be spaced from a side portion of said boss in juxtaposition to said section with other parts of said section contacting said wheel cylinder mounting boss.

11. The mounting bracket of claim 10 in which a section of the other one of said legs where it contacts said wheel cylinder mounting boss is substantially straight while the side of said boss is recessed so that spaced portions of said boss are contacted by said other one leg.

* * * * *